United States Patent
Kapoor et al.

(10) Patent No.: US 10,546,118 B1
(45) Date of Patent: Jan. 28, 2020

(54) USING A PROFILE TO PROVIDE SELECTIVE ACCESS TO RESOURCES IN PERFORMING FILE OPERATIONS

(71) Applicant: Hewlett-Packard Development Company, L.P., Spring, TX (US)

(72) Inventors: Vikram Kapoor, Cupertino, CA (US); Ian Pratt, Cambridge (GB); Gaurav Banga, Cupertino, CA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 110 days.

(21) Appl. No.: 14/333,278

(22) Filed: Jul. 16, 2014

Related U.S. Application Data (63) Continuation-in-part of application No. 13/115,354, filed on May 25, 2011, now Pat. No. 8,972,980.

(51) Int. Cl.
  *G06F 9/46*    (2006.01)
  *G06F 21/53*   (2013.01)
  *H04L 29/06*   (2006.01)
  *G06F 9/455*   (2018.01)
  *H04L 9/32*    (2006.01)

(52) U.S. Cl.
  CPC .......... *G06F 21/53* (2013.01); *G06F 9/45558* (2013.01); *H04L 9/3247* (2013.01); *H04L 63/102* (2013.01); *G06F 2009/45587* (2013.01)

(58) Field of Classification Search
  CPC ... G06F 21/53; G06F 9/45558; H04L 9/3247; H04L 63/102
  See application file for complete search history.

(56) References Cited

U.S. PATENT DOCUMENTS

| | | |
|---|---|---|
| 6,886,099 B1 | 4/2005 | Smithson et al. |
| 6,898,715 B1 | 5/2005 | Smithson et al. |
| 6,948,044 B1 | 9/2005 | Chandrasekaran |
| 7,171,523 B2 | 1/2007 | Yamasaki |
| 7,392,544 B1 | 6/2008 | Pavlyushchik |
| 7,506,265 B1 | 3/2009 | Traut et al. |
| 8,011,010 B2 | 8/2011 | Michael et al. |
| 8,146,084 B1 | 3/2012 | Meketa |
| 8,341,749 B2 | 12/2012 | Rogel |
| 8,346,727 B1 | 1/2013 | Chester et al. |
| 8,543,641 B2 | 9/2013 | Cherukuri et al. |
| 8,578,411 B1* | 11/2013 | Carney .............. H04N 21/241 725/36 |
| 2004/0128670 A1 | 7/2004 | Robinson et al. |
| 2005/0149726 A1 | 7/2005 | Joshi et al. |
| 2006/0101189 A1 | 5/2006 | Chandrasekaran et al. |
| 2006/0136910 A1 | 6/2006 | Brickell et al. |

(Continued)

FOREIGN PATENT DOCUMENTS

WO   2008073618 A2   6/2008

*Primary Examiner* — James J Lee (57) ABSTRACT

Approaches for ensuring a file operation is not performed in a malicious manner. Upon being instructed to perform the file operation on a file, a profile for the file is obtained. The profile is data that is signed by a digital signature and identifies a set of resources which said file requires. The profile associated with a particular file may be obtained in a variety of different ways. The file operation is performed in a virtual machine that lacks access to resources of the device or of a network except for those resources identified in the profile.

28 Claims, 3 Drawing Sheets

(56) References Cited

U.S. PATENT DOCUMENTS

| | | |
|---|---|---|
| 2006/0143617 A1 | 6/2006 | Knauerhase et al. |
| 2006/0184937 A1 | 8/2006 | Abels et al. |
| 2006/0288343 A1 | 12/2006 | Pallister |
| 2007/0050376 A1* | 3/2007 | Maida-Smith ...... G06F 17/3089 |
| 2007/0150956 A1 | 6/2007 | Sharma et al. |
| 2007/0180450 A1 | 8/2007 | Croft et al. |
| 2007/0192329 A1 | 8/2007 | Croft et al. |
| 2007/0250833 A1 | 10/2007 | Araujo et al. |
| 2007/0276795 A1* | 11/2007 | Poulsen ................. G06Q 90/00 |
| 2008/0001958 A1 | 1/2008 | Vembu et al. |
| 2008/0059726 A1 | 3/2008 | Rozas et al. |
| 2008/0263658 A1 | 10/2008 | Michael et al. |
| 2008/0313730 A1* | 12/2008 | Iftimie .................... G06F 21/40 726/17 |
| 2009/0007242 A1 | 1/2009 | Subramanian et al. |
| 2009/0066995 A1* | 3/2009 | Mukund ................ G03G 21/02 358/1.15 |
| 2009/0089879 A1 | 4/2009 | Wang et al. |
| 2009/0119541 A1 | 5/2009 | Inoue et al. |
| 2009/0125902 A1* | 5/2009 | Ghosh ................. G06F 9/45533 718/1 |
| 2009/0165133 A1 | 6/2009 | Hwang et al. |
| 2009/0172820 A1 | 7/2009 | Watson |
| 2009/0249472 A1 | 10/2009 | Litvin et al. |
| 2009/0276783 A1 | 11/2009 | Johnson et al. |
| 2009/0313269 A1* | 12/2009 | Bachmann ............ G06F 21/645 |
| 2009/0313620 A1 | 12/2009 | Sedukhin et al. |
| 2009/0328033 A1 | 12/2009 | Kohavi et al. |
| 2010/0122343 A1 | 5/2010 | Ghosh et al. |
| 2010/0235831 A1 | 9/2010 | Dittmer |
| 2010/0328064 A1 | 12/2010 | Rogel |
| 2011/0023028 A1 | 1/2011 | Nandagopal et al. |
| 2011/0035494 A1 | 2/2011 | Pandey et al. |
| 2011/0107299 A1* | 5/2011 | Dehaan ............... G06F 9/45533 717/121 |
| 2011/0173251 A1 | 7/2011 | Sandhu et al. |
| 2011/0296487 A1 | 12/2011 | Walsh |
| 2011/0302577 A1 | 12/2011 | Reuther et al. |
| 2012/0072968 A1 | 3/2012 | Wysopal et al. |
| 2012/0079596 A1 | 3/2012 | Thomas et al. |
| 2012/0089666 A1 | 4/2012 | Goswami et al. |
| 2012/0089980 A1 | 4/2012 | Sharp et al. |
| 2012/0144489 A1 | 6/2012 | Jarrett et al. |
| 2012/0179823 A1* | 7/2012 | Hataski ................ G06F 9/461 709/226 |
| 2012/0297383 A1 | 11/2012 | Meisner et al. |
| 2013/0094538 A1* | 4/2013 | Wang .................... H04B 1/707 375/141 |
| 2013/0153651 A1* | 6/2013 | Fedorovskaya ...... G06K 9/2036 235/375 |
| 2013/0283266 A1 | 10/2013 | Baset et al. |

\* cited by examiner

USING A PROFILE TO PROVIDE SELECTIVE ACCESS TO RESOURCES IN PERFORMING FILE OPERATIONS

CLAIM OF PRIORITY AND RELATED APPLICATION DATA

This application is a continuation-in-part of, and claims priority to, U.S. patent application Ser. No. 13/115,354, filed on May 25, 2011, having a priority date of May 28, 2010, entitled "Approaches for Securing an Internet Endpoint Using Fine-Grained Operating System Virtualization," invented by Gaurav Banga et al., the disclosure of which is hereby incorporated by reference in its entirety for all purposes as if fully set forth herein.

FIELD OF THE INVENTION

Embodiments of the invention relate to ensuring, in the course of performing a file operation on a file, the file only has access to resources previously deemed appropriate for the performance of the file operation.

BACKGROUND

Many locations, such as coffee shops, libraries, and businesses, offer the public access to wireless networks. Such access may be complimentary or available for a fee. Public computer networks are common targets for infection by malicious code. Any computer which joins an infected public network may itself become targeted and infected by malicious code residing on the network.

Presently, there are a variety of techniques for scanning digital files transferred to a computer to determine whether any portion of the digital file matches a signature associated with a known virus or malicious code. Once identified, such dangerous files are quarantined and appropriate security measures taken. Unfortunately, due to an increase in exploitation of file format vulnerabilities, attacks that exploit relatively unknown vulnerabilities are becoming more common.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for providing selective access to resources when performing file operations are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Approaches for mitigating the damage caused by malicious code often rely upon treating untrusted files differently than trusted files. Trusted files (i.e., those files deemed worthy of trust based on some set of criteria) may be executed or interpreted in an environment with access to a relatively large amount of resources, while untrusted files (i.e., those files not deemed worthy of trusted based on some set of criteria) may be executed or interpreted in an environment with access to a relatively small amount of resources. Untrusted files may be prevented from being knowingly introduced into operating environments that house sensitive data or which serve as a root of trust for a machine, such as, for example, the host operating system. In this way, the host operating system might avoid being contaminated by any malicious code carried by untrusted files.

Approaches have been previously presented which automatically execute or interpret an untrusted file within a virtual machine and, in some situations, permit trusted files to be executed or interpreted by the host operating system. Examples of patent applications describing approaches in this field include (a) U.S. patent application Ser. No. 13/115,354, filed on May 25, 2011, entitled Approaches for Securing an Internet Endpoint Using Fine-Grained Operating System Virtualization, (b) U.S. patent application Ser. No. 13/223,091, filed on Aug. 31, 2011, entitled Automated Management of Virtual Machines to Process Untrusted Data Based on Client Policy Information, (c) U.S. patent application Ser. No. 13/302,123, filed on Nov. 22, 2011, entitled Approaches for Efficient Physical to Virtual Disk Conversion, (d) U.S. patent application Ser. No. 13/419,345, filed on Mar. 13, 2012, entitled Seamless Management of Untrusted Data Using Virtual Machines, and (e) U.S. patent application Ser. No. 13/526,409, filed on Jun. 18, 2012, entitled Synchronizing Resources of a Virtualized Browser, each of which is hereby incorporated by reference for all purposes as if fully set forth herein.

A philosophical tenet of the microvirtualization techniques discussed in the five patent applications mentioned above is the notion that untrusted files should be executed or interpreted within a virtual machine having characteristics crafted for the intended activity to be conducted therein. For example, a virtual machine in which an untrusted file is to be opened and interpreted should not permitted network access if there is no reason why the file should have network access.

Certain types of documents or files may reference other network resources. As an example of this type of behavior, certain spreadsheets, upon being opened, might dynamically retrieve and data from one or more sources over a network to present a composite view. Generally speaking, files retrieved from the Internet do not exhibit this type of behavior as often as files available on an Intranet.

To ensure that a file located on an Intranet which references data located elsewhere is processed correctly, one approach might be to consider that file a trusted file so that the file may be executed or interpreted in the host operating system. Since the file is managed by the host operating system, the file should be provided with sufficient network access to enable the file to include and incorporate any data or resource referenced by the file.

However, deeming a file to be trustworthy should be the result of a thorough evaluation and not performed simply to expedite or simplify the interpretation and use of the file. What if a file references more data than it should? What if a file inadvertently carries malicious code? A danger exists if a file is deemed trustworthy and placed in an environment (such as a host operating system) where the file have access to sensitive data or resources for purposes of allowing the file to incorporate data from other sources, and subsequently the file is shown to contain malicious code or otherwise reference more data than warranted. By allowing the file to be executed or interpreted in the operating environment associated with trusted files, control over the file is effectively given up if the file turns out to be malicious or exhibits improper behavior.

Advantageously, embodiments of the invention shall be discussed herein which provide selective access to resources and prohibit certain kinds of behavior when performing file operations. Embodiments of the invention perform file operations in a virtual machine instantiated for the purpose of performing the particular file operation to be performed on the particular file. The virtual machine is instantiated with the minimum amount of resources for the file operations to be performed on the file. A profile associated with the file identifies the minimum amount of resources for file operations to be performed on the file. Various approaches below for creating a profile, retrieving a profile, and constructing a profile will be presented herein.

Figure 1:
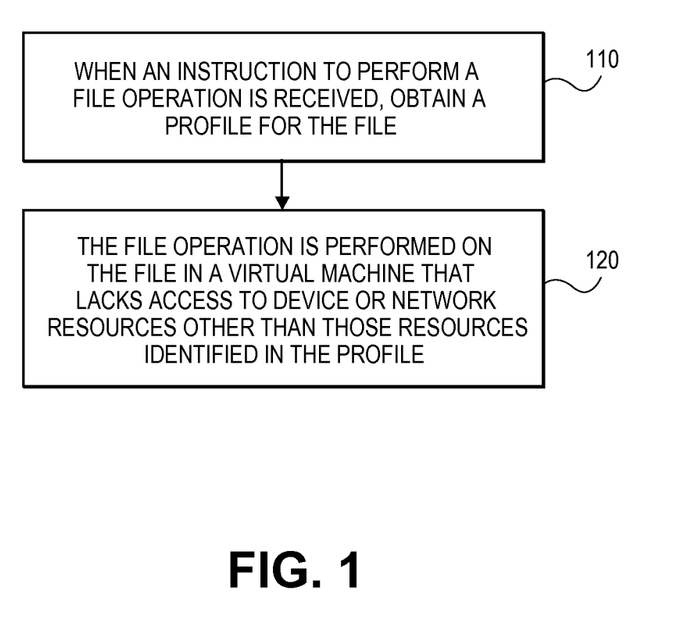
FIG. 1 is a flow chart of the functional steps of providing selective access to resources when performing file operations according to an embodiment.

Using a Profile to Provide Selective Access to Resources in Performing File Operations FIG. 1 is a flow chart of the functional steps of providing selective access to resources when performing file operations according to an embodiment. The steps of FIG. 1 shall be discussed below with reference to the block diagram of FIG. 2, which depicts an illustrative device 200 according to an embodiment of the invention. Device 200 is meant to broadly represent any type of tangible device which is capable of executing a hypervisor and a virtual machine. Non-limiting, illustrative examples of device 200 include a personal computer, a tablet computer, a cell phone, and the like.

Figure 2:
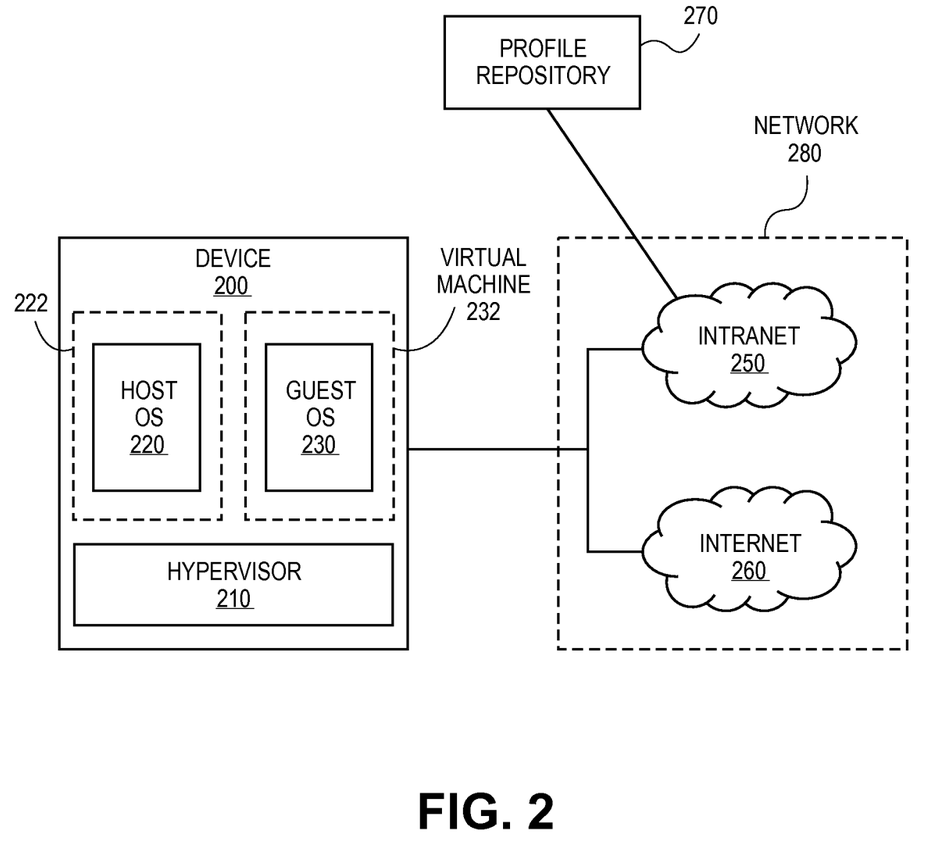
FIG. 2 is a depiction of an illustrative system according to an embodiment of the invention.

In step 110, a user of device 200 requests the performance of a file operation on a file. Hypervisor 200 is notified of the request to perform the file operation on the file. In response, hypervisor 200 obtains a profile associated with the file. After obtaining the profile, hypervisor 200 instantiates virtual machine 232 in which file operations are to be performed on the file. The instantiated virtual machine only has access to resources identified by the profile, thereby preventing file operations performed on the file in the instantiated virtual machine from accessing any resources outside of the scope of the file's apparent purpose. As depicted in FIG. 2, guest operating system 230 executes within virtual machine 232.

In an embodiment, hypervisor 200 may be a Type 1.5 hypervisor described within U.S. patent application Ser. No. 14/140,438, filed on Dec. 24, 2013, entitled A Hypervisor Managing Memory Addressed Above Four Gigabytes, the disclosure of which is hereby incorporated by reference for all purposes as if fully set forth herein. A Type 1.5 hypervisor is a hypervisor that executes at a greater privilege than host operating system 220; consequently, host operating system 220 cannot access any memory or resources belonging to or allocated by hypervisor 210. In order to place host operating system 220 at a lower privilege than hypervisor 210, certain embodiments may execute host operating system 220 within container 222.

As used herein, the term "profile" refers to data that is signed by a digital signature and identifies a set of resources that a file, associated with the profile, requires. Hypervisor 210 uses a profile when instantiating virtual machine 232 in which a file operation is to be performed upon the file associated with the profile. Each profile identifies the minimum set of resources which an instantiated virtual machine should possess in order to perform file operations in that virtual machine on the file associated with the profile.

To illustrate an example, assume that the profile associated with a particular file identifies one or more network resources which the file is authorized to access. After hypervisor 200 instantiates virtual machine 232 using this profile, virtual machine 232 is configured to deny the file access to any network resource on Internet 260 or Intranet 250 (collectively referred to as network 280) other than the network resources (which may be either or both of Intranet 250 and Internet 260) the file is authorized to access as identified by the profile.

In an embodiment, in addition to specifying which resources virtual machine 232 may access, the profile may identify a set of permissible actions which may be performed against the file while the file is being rendered, displayed, or executed. A virtual machine instantiated by hypervisor 200 using this profile would be configured to prevent any application from performing any action against the file except those expressly permitted by the profile. In this way, a profile may be used to configure acceptable behavior in layer 7 (the application layer) of the OSI model.

It should be noted that each version of a file may be associated with a different profile. In effect, different versions of a file will be treated as different files.

How a profile becomes associated with a particular file may vary from embodiment to embodiment. One manner for associating a profile with a file is by way of a cryptographic hash. In this approach, the profile would contain a cryptographic hash of the file to which the profile is associated. Other embodiments might store other types of information within a profile to identify the particular file (or files) the profile is associated.

In an embodiment, a user may create a profile for a file at the time of the file's creation. At the time of the file's creation, the user creating the file would be in position to know what addition resources the file needs in order to function as intended. With this knowledge, the creating user may access a user interface or other such mechanism which allows the user to identify those resources required by the file and to create the profile.

If a file has not yet been associated with a profile at the time a user wishes to perform a file operation on the file, then hypervisor 200 may use a default profile. Hypervisor 200 may select a particular default profile for use based on a various criteria. For example, hypervisor 200 may select a particular default profile from among a plurality of different default profiles based on where the file originated. A file that originated from the Internet 260 might be assigned an extremely restrictive default profile by hypervisor 200 whereas a file that originated from Intranet 250 might be assigned a less restrictive default profile or a default profile with access to a default set of sources commonly used by files on Intranet 250. In other embodiments, upon hypervisor 200 determining that a profile associated with a particular version of a file is not available, hypervisor 200 may obtain a default profile associated with the requester of the performance of the file operation or the supplier of the file.

In an embodiment, each profile may identify certain kinds of information to allow one to assess whether the information contained in the profile should be trusted. For example, a profile may be signed by one or more users. Any user who either creates or updates a profile may be required to sign the profile to identify themselves to subsequent users so that their name can act as evidence that the file should be trusted with access to a certain set of resources identified by the profile. In an embodiment, a user may sign a profile using a public key infrastructure (PKI). In other embodiments, in addition to a user involved in creating or updating the profile, a signed profile might also identify the location and/or the machine on which the profile was created or updated, a security posture of the machine used in creating or updating the profile, or a timestamp of the creation and/or any subsequent modification of the profile. When a user requests the performance of a file operation on a file, hypervisor 200 may cause the display of certain information in the profile (such as the user or users who have signed to profile) to the user to enable the user to judge whether virtual machine 232 should be instantiated which the characteristics identified by the profile. If the user does not approve of any information in the profile (for example, the user does not know the user who signed the profile or the resources allowed by the profile are too generous), the user may cancel the performance of the file operation or may modify the profile to his or her liking, as explained in further detail below.

There are a variety of different ways in which hypervisor 200 may obtain the profile associated with a file in step 110. In an embodiment, a profile may be embedded within, attached to, concatenated to, appended to, or otherwise accompany the file to which the profile is associated. Such an approach is advantageous, as it allows the profile of the file to be sent with the file when the file is sent. For example, when the file is emailed by a first user to a user of device 200, it would be helpful for device 200 if the email (perhaps in a manner transparently or seamlessly to the first user) contained the profile, e.g., the profile may be embedded within the email, sent as a separate attachment to the email, or comprised within the file itself. For scalability purposes, it is helpful to keep the profile and the file together such that if the file is moved or sent to a new location, the profile is similarly moved to facilitate access to the profile at a later date. For example, if a file on device 200 is stored on a USB storage device, then the profile is also caused to be stored on the USB storage device as well.

According to another approach, the profile may be stored separate from the file in a central profile repository 270 that stores profiles for a large number of files. Hypervisor 200 may obtain a cryptographic hash for a file to obtain a unique identifier for a particular version of the file. Thereafter, hypervisor 200 retrieve the profile associated with the particular version of the file using the unique identifier from the central repository 270 which stores profiles for a plurality of files.

Certain embodiments may enable a profile to store information about all the changes made to the profile or file. In such an embodiment, whenever a change is made to a profile or file, information about the change may be appended to the profile. Thereafter, the profile is signed so there is a record of who authorized the change to the profile or file. In this way, a profile may identify any user who created or modified the profile or file and any changes or additions made by those users to the profile or file.

In step 120, the requested file operation is performed on the file in virtual machine 232. Virtual machine 232 lacks access to resources of device 200 or network 280 except for the set of resources identified in the profile. Hypervisor 200 enforces the constraints identified by profile as virtual machine 232 was instantiated to have the characteristics described within the profile. Consequently, the file operation may be performed in virtual machine 232 in a manner that allows for a fine-grain level of control over the resources which are accessible to the operating environment in which the file operation is performed as well as the type of application-level type operations which are permissible. This approach denies any malicious code carried by any file to access resources of device 200 or network 280, thereby effectively rendering the harmful effects of malicious code moot.

In another embodiment, each device may locally interpret the profile to determine what resources of the device should be made available to virtual machine 232. For example, In an embodiment, a file might have a legitimate reason for desiring access to a resource of device 200 or network 280 which was not authorized by the profile associated with the file. When hypervisor 200 detects that a file in virtual machine 232 is attempting to access a resource not available to virtual machine 232, hypervisor 200 may notify the user to request authorization from the user to grant the file access to that resource. In response, the user can grant the file access to the resource. Thereafter, the profile associated with the file is updated to identify that the file has been granted authorization to access the resource by the user.

Profile as a Graphic

In an embodiment, the profile may be implemented or expressed as a graphic, such as a GIF file. In other words, the data comprising the profile may be encoded into the graphic so that the profile data may be identified by analyzing data of the graphic.

According to this approach, if one sends an email that attaches a file, the profile may be seamlessly embedded into the email as a graphic (i.e., the graphic profile would not be attached to the email, but embedded within the email). If the email was sent to a device that was not configured to process profiles, then the profile would appear to be a non-distracting graphic and would be naturally ignored.

Hardware Mechanisms

Figure 3:
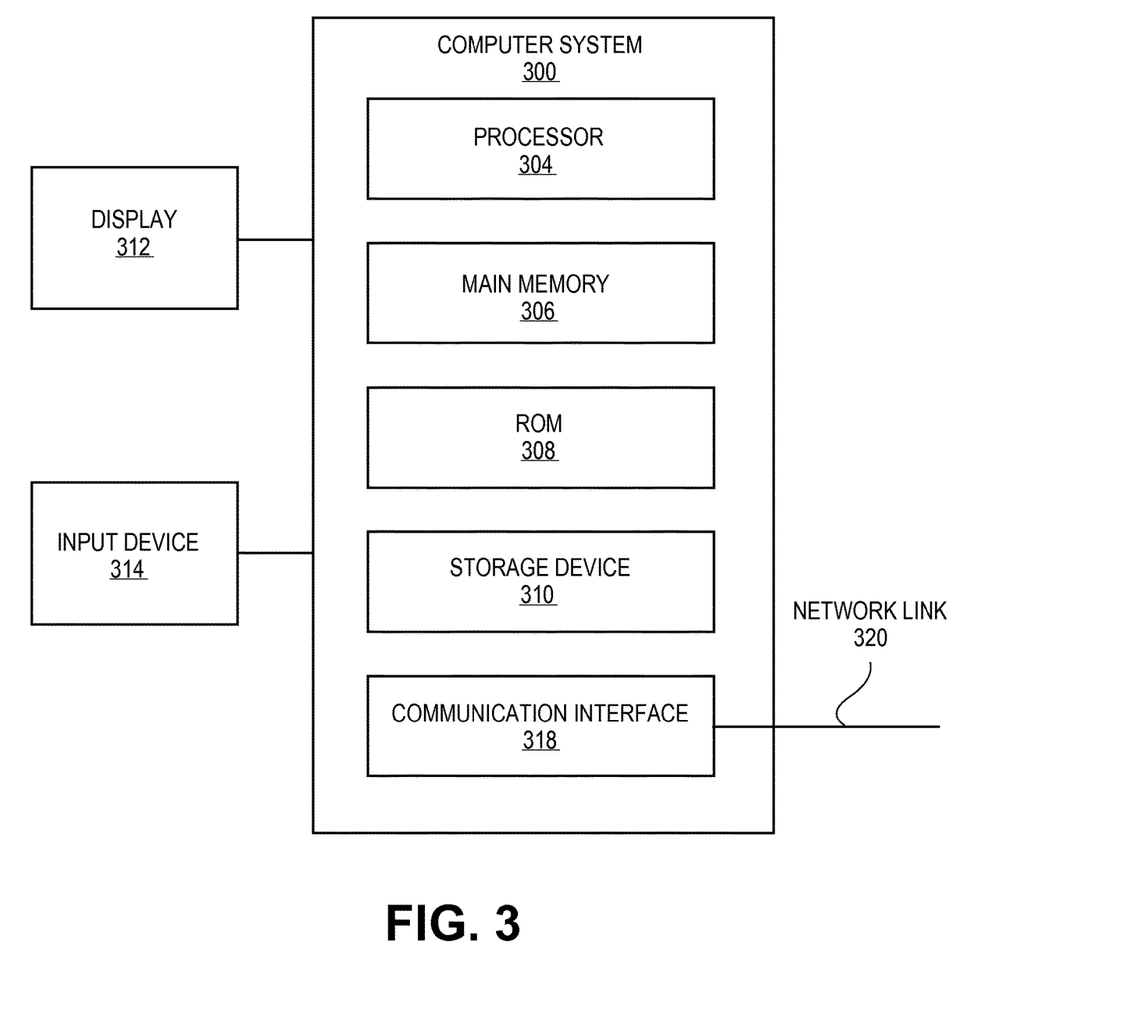
FIG. 3 is a block diagram that illustrates a computer system upon which an embodiment of the invention may be implemented.

In an embodiment, device 200 of FIG. 2 may be implemented on or correspond to a computer system. FIG. 3 is a block diagram that illustrates a computer system 300 upon which an embodiment of the invention may be implemented. In an embodiment, computer system 300 includes processor 304, main memory 306, ROM 308, storage device 310, and communication interface 318. Computer system 300 includes at least one processor 304 for processing information. Computer system 300 also includes a main memory 306, such as a random access memory (RAM) or other dynamic storage device, for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device for storing static information and instructions for processor 304. A storage device 310, such as a magnetic disk or optical disk, is provided for storing information and instructions.

Computer system 300 may be coupled to a display 312, such as a cathode ray tube (CRT), a LCD monitor, and a television set, for displaying information to a user. An input device 314, including alphanumeric and other keys, is coupled to computer system 300 for communicating information and command selections to processor 304. Other non-limiting, illustrative examples of input device 314 include a mouse, a trackball, or cursor direction keys for communicating direction information and command selections to processor 304 and for controlling cursor movement on display 312. While only one input device 314 is depicted in FIG. 3, embodiments of the invention may include any number of input devices 314 coupled to computer system 300.

Embodiments of the invention are related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 304 for execution. For example, the instructions may initially be carried on a magnetic disk of a remote computer. The remote computer can load the instructions into its dynamic memory and send the instructions over a network link 320 to computer system 300.

Communication interface 318 provides a two-way data communication coupling to a network link 320 that is connected to a local network. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through a local network to a host computer or to data equipment operated by an Internet Service Provider (ISP).

Computer system 300 can send messages and receive data, including program code, through the network(s), network link 320 and communication interface 318. For example, a server might transmit a requested code for an application program through the Internet, a local ISP, a local network, subsequently to communication interface 318. The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions for performing a file operation, which when executed by one or more processors, causes:

upon being instructed by a user of a device to perform the file operation on a file, a hypervisor of the device obtaining a profile for the file by retrieving said profile associated with said file, wherein the profile is data that is signed by a digital signature and identifies a particular set of resources which said file requires when any file operation, initiated by any user, is performed using said file, wherein said particular set of resources are made accessible to a virtual machine in which the file operation is to be performed;

the hypervisor instantiating said virtual machine on the device using said profile in response to receiving the instruction to perform the file operation on the file;

performing the file operation on said file in said virtual machine that lacks access to resources of the device or of a network except for the particular set of resources identified in the profile; and the hypervisor enforcing constraints in permissible actions involving the file identified by the profile during and after the instantiation of the virtual machine.

2. The non-transitory computer-readable storage medium of claim 1, wherein the profile identifies one or more of: any user who created or modified the profile, a security posture of a machine or location at which the profile was created or last modified, and a timestamp for the creation and any subsequent modification of the profile.

3. The non-transitory computer-readable storage medium of claim 1, wherein the profile identifies any user who created or modified the file and any changes or additions made by those users to the file.

4. The non-transitory computer-readable storage medium of claim 1, wherein execution of the one or more sequences of instructions further causes:
    in response to determining the file is requesting access to a resource not authorized by the profile, requesting authorization from the user to grant the file access to said resource; and
    upon the user granting the file access to said resource, updating the profile to identify that the file has authorization to access said resource by the user.

5. The non-transitory computer-readable storage medium of claim 1, wherein the profile identifies one or more network resources which the file is authorized to access, and wherein the virtual machine is configured to deny the file access to any network resource other than said one or more network resources the file is authorized to access by the profile.

6. The non-transitory computer-readable storage medium of claim 1, wherein the profile identifies a set of permissible actions which may be performed against the file while the file is being rendered, displayed, or executed.

7. The non-transitory computer-readable storage medium of claim 6, wherein the set of permissible actions includes one or more permissible actions which may be performed against the file by an application, and wherein the virtual machine is configured to prevent the application from performing any action against the file except those expressly permitted by the profile.

8. The non-transitory computer-readable storage medium of claim 1, wherein the profile is separate from the file, and wherein obtaining the profile comprises:
    accessing the profile stored or transmitted with the file.

9. The non-transitory computer-readable storage medium of claim 1, wherein the profile is separate from the file, and wherein obtaining the profile comprises:
    obtaining a cryptographic hash for the file to obtain a unique identifier for a particular version of the file; and
    retrieving the profile for the particular version of the file, using the unique identifier, from a central repository which stores profiles for a plurality of files.

10. The non-transitory computer-readable storage medium of claim 1, wherein obtaining the profile comprises:
    accessing the profile embedded within, attached, or appended to the file.

11. The non-transitory computer-readable storage medium of claim 1, wherein obtaining the profile comprises:
    upon determining that the profile associated with a present version of the file is not available, obtaining a default profile associated with the requester of the performance of the file operation or the supplier of the file.

12. The non-transitory computer-readable storage medium of claim 1, wherein the profile is a digital image encoded with information identifying said set of resources.

13. The non-transitory computer-readable storage medium of claim 12, wherein the file is received in an email in which the profile is embedded.

14. The non-transitory computer-readable storage medium of claim 1, wherein the device is a first device, and wherein execution of the one or more sequences of instructions further causes:
    a second device performing a second file operation on a copy of said file in a second virtual machine, executing on the second device, that lacks access to resources of the second device or of said network except for a set of resources determined by the second device as a result of the second device interpreting the profile for the file.

15. An apparatus for performing a file operation, comprising:
    one or more processors; and
    one or more non-transitory computer-readable storage mediums storing one or more sequences of instructions, which when executed, cause:
        upon being instructed by a user of a device to perform the file operation on a file, a hypervisor of the device obtaining a profile for the file by retrieving said profile associated with said file, wherein the profile is data that is signed by a digital signature and identifies a particular set of resources which said file requires when any file operation, initiated by any user, is performed using said file, wherein said particular set of resources are made accessible to a virtual machine in which the file operation is to be performed;
        the hypervisor instantiating said virtual machine on the device using said profile in response to receiving the instruction to perform the file operation on the file;
        performing the file operation on said file in said virtual machine that lacks access to resources of the device or of a network except for the particular set of resources identified in the profile; and
        the hypervisor enforcing constraints in permissible actions involving the file identified by the profile during and after the instantiation of the virtual machine.

16. The apparatus of claim 15, wherein execution of the one or more sequences of instructions further causes:
    in response to determining the file is requesting access to a resource not authorized by the profile, requesting authorization from the user to grant the file access to said resource; and
    upon the user granting the file access to said resource, updating the profile to identify that the file has authorization to access said resource by the user.

17. The apparatus of claim 15, wherein the profile is separate from the file, and wherein obtaining the profile comprises:
    obtaining a cryptographic hash for the file to obtain a unique identifier for a particular version of the file; and
    retrieving the profile for the particular version of the file, using the unique identifier, from a central repository which stores profiles for a plurality of files.

18. The apparatus of claim 15, wherein the device is a first device, and wherein execution of the one or more sequences of instructions further causes:
    a second device performing a second file operation on a copy of said file in a second virtual machine, executing on the second device, that lacks access to resources of the second device or of said network except for a set of resources determined by the second device as a result of the second device interpreting the profile for the file.

19. The apparatus of claim 15, wherein the profile identifies one or more of: any user who created or modified the profile, a security posture of a machine or location at which the profile was created or last modified, and a timestamp for the creation and any subsequent modification of the profile.

20. The apparatus of claim 15, wherein the profile identifies any user who created or modified the file and any changes or additions made by those users to the file.

21. The apparatus of claim 15, wherein the profile identifies one or more network resources which the file is authorized to access, and wherein the virtual machine is configured to deny the file access to any network resource other than said one or more network resources the file is authorized to access by the profile.

22. The apparatus of claim 15, wherein the profile identifies a set of permissible actions which may be performed against the file while the file is being rendered, displayed, or executed.

23. The apparatus of claim 22, wherein the set of permissible actions includes one or more permissible actions which may be performed against the file by an application, and wherein the virtual machine is configured to prevent the application from performing any action against the file except those expressly permitted by the profile.

24. The apparatus of claim 15, wherein the profile is separate from the file, and wherein obtaining the profile comprises:
   accessing the profile stored or transmitted with the file.

25. The apparatus of claim 15, wherein obtaining the profile comprises:
   accessing the profile embedded within, attached, or appended to the file.

26. The apparatus of claim 15, wherein obtaining the profile comprises:
   upon determining that the profile associated with a present version of the file is not available, obtaining a default profile associated with the requester of the performance of the file operation or the supplier of the file.

27. The apparatus of claim 15, wherein the profile is a digital image encoded with information identifying said set of resources.

28. The apparatus of claim 27, wherein the file is received in an email in which the profile is embedded.

\* \* \* \* \*